US012623958B2

(12) United States Patent
Noda et al.

(10) Patent No.: US 12,623,958 B2
(45) Date of Patent: May 12, 2026

(54) METHOD FOR MANUFACTURING REINFORCED GLASS, AND REINFORCED GLASS

(71) Applicant: Nippon Electric Glass Co., Ltd., Shiga (JP)

(72) Inventors: Takayuki Noda, Shiga (JP); Shigeyoshi Ito, Shiga (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 385 days.

(21) Appl. No.: 18/012,511

(22) PCT Filed: Jul. 14, 2021

(86) PCT No.: PCT/JP2021/026492
§ 371 (c)(1),
(2) Date: Dec. 22, 2022

(87) PCT Pub. No.: WO2022/024767
PCT Pub. Date: Feb. 3, 2022

(65) Prior Publication Data
US 2023/0250013 A1      Aug. 10, 2023

(30) Foreign Application Priority Data
Jul. 30, 2020      (JP) ................................. 2020-128931

(51) Int. Cl.
*C03C 15/00*          (2006.01)
*C03C 3/083*          (2006.01)
*C03C 21/00*          (2006.01)
(52) U.S. Cl.
CPC .............. *C03C 15/00* (2013.01); *C03C 3/083* (2013.01); *C03C 2203/50* (2013.01)

(58) Field of Classification Search
None
See application file for complete search history.

(56) References Cited

U.S. PATENT DOCUMENTS

| | | | |
|---|---|---|---|
| 2011/0165393 A1 | 7/2011 | Bayne et al. | |
| 2015/0210588 A1 | 7/2015 | Chang et al. | |
| | (Continued) | | |

FOREIGN PATENT DOCUMENTS

| | | | | |
|---|---|---|---|---|
| CN | 105102388 | | 11/2015 | |
| CN | 112086023 A | * | 12/2020 | ............. C03C 15/00 |
| | (Continued) | | | |

OTHER PUBLICATIONS

Machine translation WO2012093525 (Year: 2012).*

(Continued)

*Primary Examiner* — Jodi C Franklin
(74) *Attorney, Agent, or Firm* — Wenderoth, Lind & Ponack, L.L.P.

(57) ABSTRACT

Provided is a method of manufacturing a tempered glass, including an etching step of etching a plate-shaped or sheet-shaped chemically tempered glass having a compressive stress layer in a surface thereof. The method further includes a step of preparing, as the chemically tempered glass before the etching, a chemically tempered glass, which has in at least part thereof a bendable thin portion having a thickness t1a, in which the thickness t1a is 150 μm or less, in which a maximum compressive stress CSa in the compressive stress layer before the etching is 1,100 MPa or less, and in which a depth DOLa of the compressive stress layer before the etching is less than 15 μm. The etching step includes etching the chemically tempered glass so that an etching amount Δt on one surface of the chemically tempered glass is 0.25 μm or more and 3 μm or less.

9 Claims, 2 Drawing Sheets

(56) References Cited

U.S. PATENT DOCUMENTS

| 2017/0036941 | A1 | | 2/2017 | Lee et al. |
| 2019/0337845 | A1 | | 11/2019 | Heiß-Chouquet et al. |
| 2020/0392038 | A1 | * | 12/2020 | Park .................... H04M 1/0268 |
| 2021/0070650 | A1 | | 3/2021 | Da et al. |
| 2021/0107826 | A1 | * | 4/2021 | Hwang .............. C03C 17/3405 |

FOREIGN PATENT DOCUMENTS

| DE | 102018110498 | A1 | * | 11/2019 | ............. C03C 15/00 |
| JP | 2016-102060 | | | 6/2016 | |
| JP | 2017-171571 | | | 9/2017 | |
| JP | 6382443 | B2 | * | 8/2018 | .............. C03C 4/18 |
| JP | 2019-199393 | | | 11/2019 | |
| KR | 20170122554 | A | * | 11/2017 | .......... G06F 1/1652 |
| WO | 2019/219009 | | | 11/2019 | |

OTHER PUBLICATIONS

WO2012093525 machine translation (Year: 2012).*
International Search Report issued Oct. 5, 2021, in International (PCT) Application No. PCT/JP2021/026492, with English translation.
International Preliminary Report on Patentability issued Jan. 31, 2023, in International (PCT) Application No. PCT/JP2021/026492.
The Second Office Action issued May 1, 2025 in corresponding Chinese Patent Application No. 202180044121.4, with English language translation.

* cited by examiner

METHOD FOR MANUFACTURING REINFORCED GLASS, AND REINFORCED GLASS

TECHNICAL FIELD

The present invention relates to a method of manufacturing a tempered glass, and a tempered glass.

BACKGROUND ART

In recent years, a chemically tempered glass having a sheet thickness of from about 0.4 mm to about 1.0 mm has been often used as a cover glass for each of various electronic terminals and display devices. Particularly when used for a portable electronic terminal such as a smartphone, strength of the cover glass is important. For example, in Patent Literature 1, there is a disclosure of a technology for improving the strength, involving subjecting a glass surface to etching treatment after chemical tempering to remove a defect on the glass surface.

CITATION LIST

Patent Literature 1: JP 2016-102060 A

SUMMARY OF INVENTION

Technical Problem

In recent years, there have been developed devices, such as a smartphone and a tablet PC, of a so-called foldable type, in which a display surface of a display is configured to be foldable. A cover glass to be used for such device needs to have a smaller sheet thickness than in the related art so as to be foldable. In addition, an extremely high internal tensile stress acts on the cover glass at its bent portion at the time of folding, and hence the presence of a defect or a crack on a surface of the bent portion serves as a cause of breakage, and moreover, the glass becomes liable to be shattered at the time of breakage. Accordingly, the cover glass for such application needs to be further suppressed from having a surface defect and reduced in internal tensile stress as compared to the related art.

However, the related-art glass like that of Patent Literature 1 described above is supposed to be used for a device of a type not to be folded (so-called straight type), and is not assumed to be applied to a foldable-type smartphone device. Accordingly, even when an attempt was made to apply the related-art glass to such application, sufficient bending performance was not obtained. In addition, bending strength enough to endure bending was not obtained. In addition, the glass was not able to be sufficiently suppressed from bursting and scattering at the time of breakage.

An object of the present invention is to provide a method of manufacturing a tempered glass, and a tempered glass, which can simultaneously achieve high bending performance, high bending strength, and suppression of shattering at the time of breakage.

Solution to Problem

According to one embodiment of the present invention, there is provided a method of manufacturing a tempered glass, comprising an etching step of etching a plate-shaped or sheet-shaped chemically tempered glass having a compressive stress layer in a surface thereof, the method further comprising a step of preparing, as the chemically tempered glass before the etching, a chemically tempered glass, which has in at least part thereof a bendable thin portion having a thickness $t1a$, in which the thickness $t1a$ is 150 μm or less, in which a maximum compressive stress $CSa$ in the compressive stress layer before the etching is 1,100 MPa or less, and in which a depth $DOLa$ of the compressive stress layer before the etching is less than 15 μm, wherein the etching step comprises etching the chemically tempered glass so that an etching amount $\Delta t$ on one surface of the chemically tempered glass is 0.25 μm or more and 3 μm or less.

In the method of manufacturing a tempered glass according to the one embodiment of the present invention, it is preferred that the etching cause a thickness $t1b$ of the thin portion after the etching to be 149.5 μm or less, a maximum compressive stress $CSb$ in the compressive stress layer after the etching to be 400 MPa or more and 950 MPa or less, and a depth $DOLb$ of the compressive stress layer after the etching to be 14.75 μm or less.

In the method of manufacturing a tempered glass according to the one embodiment of the present invention, it is preferred that: the chemically tempered glass before the etching comprise a plurality of thick portions each having a thickness $t2a$ larger than the thickness $t1a$ of the thin portion; the thickness $t2a$ be more than 150 μm; and the thin portion extend in a band shape so as to connect the plurality of thick portions.

In the method of manufacturing a tempered glass according to the one embodiment of the present invention, it is preferred that the chemically tempered glass before the etching be entirely formed of the thin portion, and have a substantially uniform sheet thickness.

In the method of manufacturing a tempered glass according to the one embodiment of the present invention, it is preferred that: the etching be wet etching; and the etching be performed by bringing an etching medium into contact with all surfaces of the chemically tempered glass.

In the method of manufacturing a tempered glass according to the one embodiment of the present invention, it is preferred that: the etching medium be an aqueous solution containing HF; the aqueous solution containing HF be an aqueous solution containing only HF at a concentration of from 0.1 mol/L to 30 mol/L, or an aqueous solution containing HF at a concentration of from 0.1 mol/L to 30 mol/L, and one substance selected from the group consisting of: HCl; $HNO_3$; $H_2SO_4$; and $NH_4F$, the one substance having a concentration of from 0.1 mol/L to 30 mol/L; and the etching be performed by immersing the chemically tempered glass in the aqueous solution having a temperature of from 10° C. to 30° C. for from 0.1 minute to 60 minutes.

In the method of manufacturing a tempered glass according to the one embodiment of the present invention, it is preferred that the etching medium be an alkaline aqueous solution.

In the method of manufacturing a tempered glass according to the one embodiment of the present invention, it is preferred that: the alkaline aqueous solution be an aqueous solution containing NaOH or KOH as an alkali component; and the etching be performed by immersing the chemically tempered glass in the aqueous solution, which has a concentration of the alkali component of from 1 mol/L to 20 mol/L and a temperature of from 10° C. to 130° C., for from 0.5 minute to 120 minutes.

In the method of manufacturing a tempered glass according to the one embodiment of the present invention, it is preferred that main surfaces of the chemically tempered glass before the etching be non-polished surfaces.

In the method of manufacturing a tempered glass according to the one embodiment of the present invention, it is preferred that a maximum value CTb of an internal tensile stress of the chemically tempered glass after the etching, which is determined by the following equation (A), where t1b represents a thickness of the thin portion after the etching, CSb represents a maximum compressive stress in the compressive stress layer after the etching, and DOLb represents a depth of the compressive stress layer after the etching, be set to 120 MPa or more and 450 MPa or less.

$$CTb=CSb \times DOLb/(t1b-2 \times DOLb) \tag{A}$$

In the method of manufacturing a tempered glass according to the one embodiment of the present invention, it is still more preferred that: the thickness t1a be 70 μm or less; and the maximum compressive stress CSa in the compressive stress layer before the etching be 600 MPa or more and 900 MPa or less.

In the method of manufacturing a tempered glass according to the one embodiment of the present invention, it is still more preferred that: the thickness t1b be 69.5 μm or less; the maximum compressive stress CSb in the compressive stress layer after the etching be set to 400 MPa or more and 700 MPa or less; and the depth DOLb of the compressive stress layer after the etching be set to 13 μm or less.

According to one embodiment of the present invention, there is provided a method of manufacturing a tempered glass, comprising an etching step of etching a plate-shaped or sheet-shaped chemically tempered glass having a compressive stress layer in a surface thereof, the chemically tempered glass comprising a bendable thin portion, wherein, in the etching step, an etching amount Δt on one surface of the chemically tempered glass is set to 0.25 μm or more and 3 μm or less, and wherein the etching causes a thickness t1b of the thin portion after the etching to be 149.5 μm or less, a maximum compressive stress CSb in the compressive stress layer after the etching to be 950 MPa or less, and a depth DOLb of the compressive stress layer after the etching to be 14.75 μm or less.

In the method of manufacturing a tempered glass according to the one embodiment of the present invention, it is preferred that: the chemically tempered glass be entirely formed of a bendable thin portion having a thickness of 70 μm or less; the etching amount Δt on the one surface of the chemically tempered glass in the etching step be set to 0.5 μm or more and 3 μm or less; and the etching cause the thickness t1b of the thin portion after the etching to be 69.5 μm or less, the maximum compressive stress CSb in the compressive stress layer after the etching to be 400 MPa or more and 700 MPa or less, and the depth DOLb of the compressive stress layer after the etching to be 13 μm or less.

According to one embodiment of the present invention, there is provided a plate-shaped or sheet-shaped tempered glass having a compressive stress layer in a surface thereof, the tempered glass comprising in at least part thereof a bendable thin portion having a thickness t1b, wherein the thickness t1b is 149.5 μm or less, wherein a maximum compressive stress CSb in the compressive stress layer is 950 MPa or less, wherein the compressive stress layer has a depth DOLb of 14.75 μm or less, and wherein at least a surface of the thin portion is formed of an etched surface.

In the tempered glass according to the one embodiment of the present invention, it is preferred that: all surfaces of the tempered glass be each formed of the etched surface; the thickness t1b be 20 μm or more and 149.5 μm or less; the maximum compressive stress CSb in the compressive stress layer be 400 MPa or more and 850 MPa or less; and the depth DOLb of the compressive stress layer be 3 μm or more and 13 μm or less.

In the tempered glass according to the one embodiment of the present invention, it is preferred that: the tempered glass comprise a plurality of thick portions each having a thickness t2b larger than the thickness t1b of the thin portion; the thickness t2b be 150 μm or more and 300 μm or less; and the thin portion extend in a band shape so as to connect the plurality of thick portions.

In the tempered glass according to the one embodiment of the present invention, it is preferred that the thin portion have a band width of 3 mm or more.

In the tempered glass according to the one embodiment of the present invention, it is preferred that the tempered glass be entirely formed of the thin portion, and have a substantially uniform sheet thickness.

In the tempered glass according to the one embodiment of the present invention, it is preferred that a maximum value CTb of an internal tensile stress of the tempered glass after the etching, which is determined by the following equation (B), where t1b represents a thickness of the thin portion after the etching, CSb represents a maximum compressive stress in the compressive stress layer after the etching, and DOLb represents a depth of the compressive stress layer after the etching, be set to 120 MPa or more and 450 MPa or less.

$$CTb=CSb \times DOLb/(t1b-2 \times DOLb) \tag{B}$$

It is preferred that the tempered glass according to the one embodiment of the present invention comprise as a glass composition, in terms of mass %, 50% to 80% of $SiO_2$, 5% to 25% of $Al_2O_3$, 0% to 15% of $B_2O_3$, 1% to 20% of $Na_2O$, and 0% to 10% of $K_2O$.

In the tempered glass according to the one embodiment of the present invention, it is preferred that: the tempered glass have a two-point bending strength of 1,500 MPa or more at the thin portion; and the tempered glass be free from undergoing breakage in a continuous bending test involving repeatedly bending the thin portion 200,000 times at a bending radius of 1.5 mm.

In the tempered glass according to the one embodiment of the present invention, it is still more preferred that: the thickness t1b be 69.5 μm or less; the maximum compressive stress CSb in the compressive stress layer after the etching be 400 MPa or more and 700 MPa or less; and the depth DOLb of the compressive stress layer after the etching be 13 μm or less.

Advantageous Effects of Invention

According to the present invention, the tempered glass simultaneously achieving high bending performance, high bending strength, and suppression of shattering at the time of breakage as compared to that of the related art is obtained.

5

Figure 4:
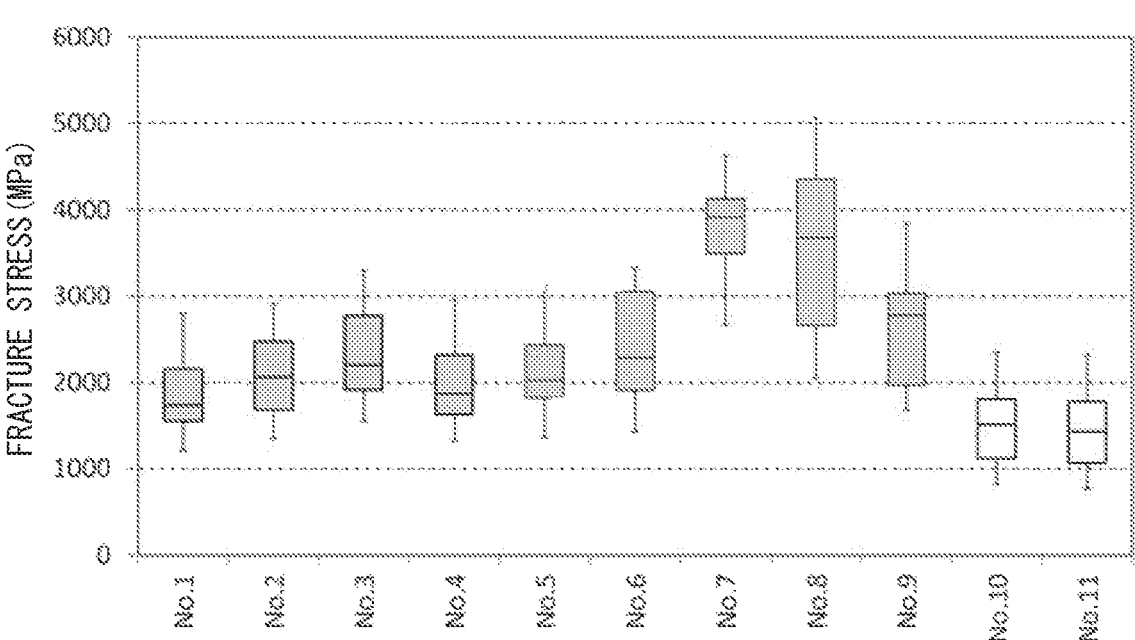

FIG. 4 is a graph showing results of a two-point bending test in Examples of the present invention.

DESCRIPTION OF EMBODIMENTS

First Embodiment

A method of manufacturing a tempered glass, and a tempered glass, according to a first embodiment of the present invention are described below.

<Method of Manufacturing Tempered Glass>

A tempered glass 1*b* according to the first embodiment of the present invention is obtained by subjecting a chemically tempered glass 1*a* to be etched to etching treatment.

Figure 1:
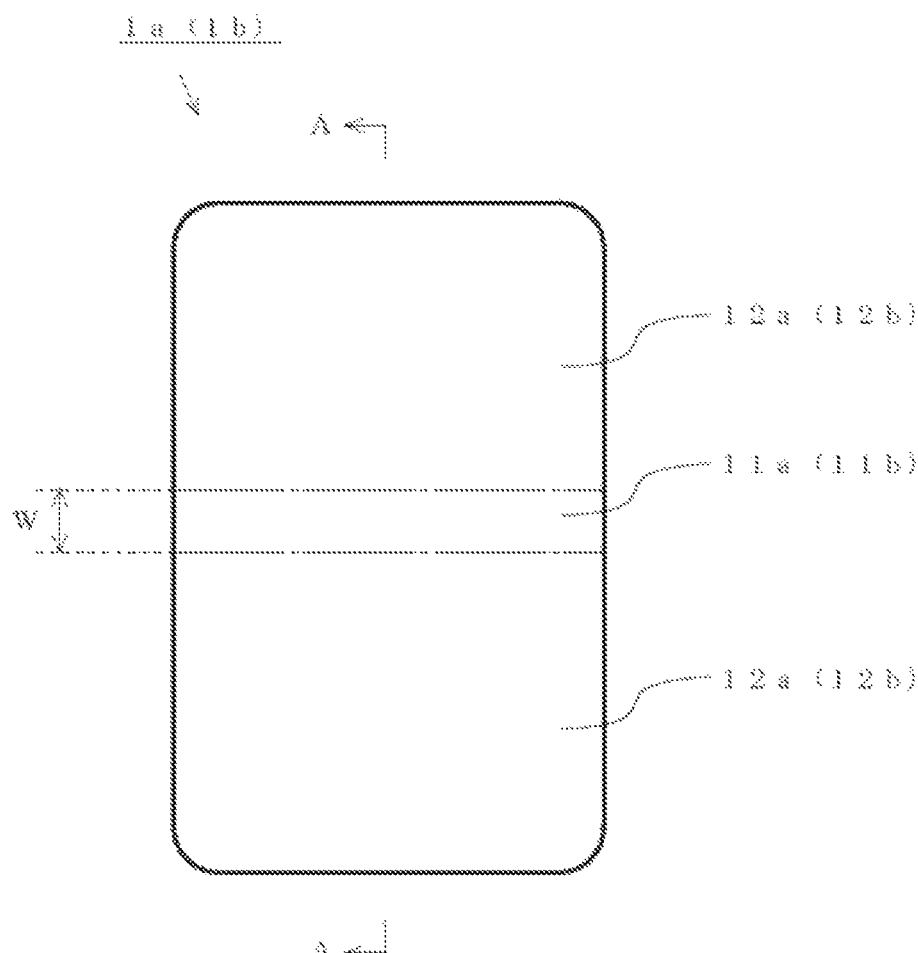
FIG. 1 is a schematic plan view of tempered glasses before and after etching according to a first embodiment of the present invention as viewed from a thickness direction.
Figure 2:
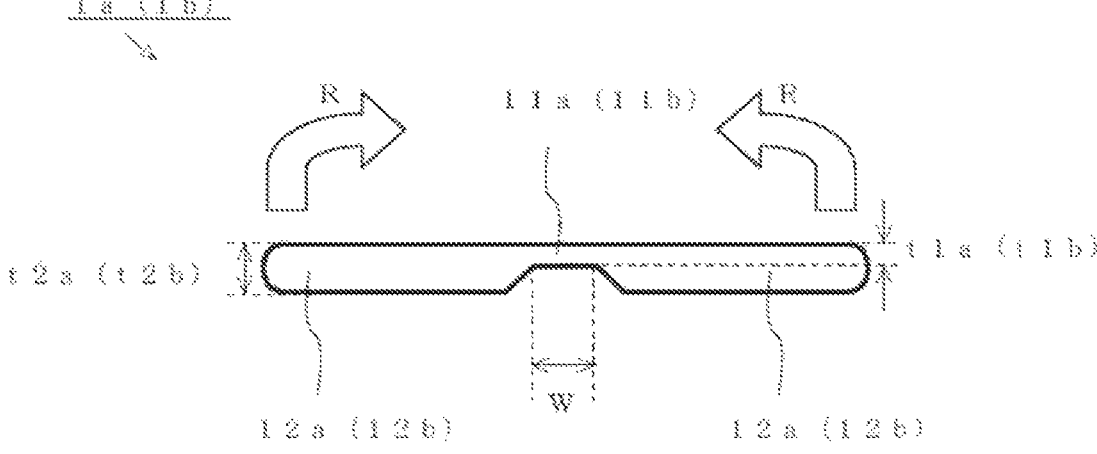
FIG. 2 is a cross-sectional schematic view of the tempered glasses before and after etching according to the first embodiment of the present invention.

First, the chemically tempered glass 1*a* to be etched is prepared. FIG. 1 is a schematic plan view of the chemically tempered glass 1*a* to be etched before etching and the tempered glass 1*b* after etching according to the first embodiment of the present invention as viewed from a thickness direction. FIG. 2 is a schematic view of the cross-section taken along the line AA of FIG. 1. In the present invention, the tempered glass 1*b* is obtained by etching the chemically tempered glass 1*a* to be etched, but an etching amount is extremely small as compared to dimensions of the glass, and hence a schematic shape of the glass in a bird's-eye view does not significantly change before and after the etching. Accordingly, in each of FIG. 1 and FIG. 2, for the chemically tempered glass 1*a* to be etched and the tempered glass 1*b*, the schematic shapes of both the glasses are illustrated on the same drawing by denoting corresponding portions with reference symbols in parentheses.

As illustrated in FIG. 1, the chemically tempered glass 1*a* to be etched is a plate-shaped or sheet-shaped chemically tempered glass. In this embodiment, as illustrated in FIG. 1, a case in which the chemically tempered glass 1*a* to be etched and the tempered glass 1*b* each have a rectangular shape having long sides and short sides in plan view is exemplified. A length of each of the long sides of the chemically tempered glass 1*a* to be etched is, for example, 50 mm or more and 500 mm or less, preferably 60 mm or more and 450 mm or less, more preferably 65 mm or more and 400 mm or less, still more preferably 70 mm or more and 300 mm or less, 75 mm or more and 200 mm or less, or 80 mm or more and 160 mm or less. A length of each of the short sides is, for example, 40 mm or more and 400 mm or less, preferably 45 mm or more and 350 mm or less, more preferably 50 mm or more and 300 mm or less, still more preferably 55 mm or more and 120 mm or less, or 60 mm or more and 80 mm or less.

The chemically tempered glass 1*a* to be etched comprises a bendable thin portion 11*a* in at least part thereof. The term "bendable" as used in the present invention refers to having such flexibility as to have a minimum bending radius of 10 mm or less without undergoing breakage at the time of bending.

The chemically tempered glass 1*a* to be etched comprises thick portions 12*a* each having a relatively larger thickness than the thin portion 11*a*. The chemically tempered glass 1*a* to be etched comprises a plurality of the thick portions 12*a*.

The thin portion 11*a* is arranged so as to divide and mutually link the two thick portions 12*a*. In other words, the thin portion 11*a* extends in a band shape from one end of the chemically tempered glass 1*a* to the other end thereof. More specifically, the thin portion 11*a* is arranged in parallel to the short sides so as to cross main surfaces of the chemically tempered glass 1*a* to be etched from the middle part of one long side to the middle part of the other long side.

A thickness t1a of the thin portion 11*a* is 150 μm or less, preferably 20 μm or more and 150 μm or less, more preferably 20 μm or more and 120 μm or less, still more preferably 25 μm or more and 100 μm or less. The thickness of the thin portion 11*a* is preferably constant, but when the thickness is not constant, the thickness of the thinnest portion in the thin portion 11*a* may be determined as t1a.

A width W of the thin portion 11*a* is, for example, 3 mm or more and 50 mm or less, preferably 5 mm or more and 30 mm or less. The width of the thin portion 11*a* is preferably constant.

A thickness t2a of each of the thick portions 12*a* is, for example, more than 150 μm, preferably more than 150 μm and 300 μm or less, more preferably 160 μm or more and 270 μm or less, still more preferably 170 μm or more and 250 μm or less. The thickness t2a of each of the thick portions 12*a* is preferably constant.

When the chemically tempered glass 1*a* to be etched is configured to have the above-mentioned dimensions in advance, the tempered glass 1*b* to be described later can be obtained with a minute etching amount Δt, that is, with high productivity.

The chemically tempered glass 1*a* to be etched comprises a compressive stress layer in a surface thereof. A maximum compressive stress CSa in the compressive stress layer of the chemically tempered glass ha to be etched (compressive stress layer before etching) is 1,100 MPa or less, preferably 550 MPa or more and 1,000 MPa or less, more preferably 580 MPa or more and 950 MPa or less, still more preferably 600 MPa or more and 900 MPa or less, still more preferably 650 MPa or more and 880 MPa or less.

A depth DOLa of the compressive stress layer of the chemically tempered glass 1*a* to be etched (compressive stress layer before etching) is less than 15 μm, preferably 5 μm or more and 14 μm or less, more preferably 6 μm or more and 13.5 μm or less, still more preferably 8 μm or more and 13 μm or less.

When stress characteristics of the chemically tempered glass 1*a* to be etched before etching are set to fall within the above-mentioned ranges, a maximum compressive stress CSb and a compressive stress depth DOLb after etching can be kept high.

The stress-related numerical values, such as the maximum compressive stress and the depth of the compressive stress layer, in the present invention may be measured with, for example, a measurement apparatus, such as FSM-6000 or SLP-1000 manufactured by Orihara Industrial Co., Ltd.

The chemically tempered glass 1*a* to be etched is obtained by forming and processing glass to be chemically tempered into the above-mentioned shape, followed by ion exchange treatment.

The glass to be chemically tempered is obtained by, for example, cutting plate-shaped or sheet-shaped mother glass, which has been obtained by a forming method, such as an overflow down-draw method, a slot down-draw method, a float method, or a re-draw method, into small-piece glass, followed by processing. In order to obtain a smooth surface, the overflow down-draw method is preferably used as the forming method. The cut small-piece glass is subjected to processing for forming a recessed groove in order to form the thin portion 11*a*. The recessed groove is formed by processing, such as etching or grinding.

End surfaces of the glass to be chemically tempered are preferably subjected to treatment for chamfering or strength improvement through polishing, heat treatment, etching, or the like. Main surfaces of the glass to be chemically tempered may be subjected to polishing treatment, but for example, when the glass to be chemically tempered is formed to have smooth main surfaces in advance by the overflow down-draw method, or formed to have a uniform thickness with good accuracy, the main surfaces may be non-polished surfaces without being subjected to polishing treatment. When the glass to be chemically tempered is formed by the overflow down-draw method and not polished, the main surfaces thereof are fire-polished surfaces. The glass to be chemically tempered may be further subjected to slimming treatment involving reducing its thickness through etching. The term "main surfaces" as used in the present invention refers to front and back surfaces excluding end surfaces among all surfaces of plate-shaped or sheet-shaped glass.

Glass of any composition may be adopted as the glass to be chemically tempered as long as the glass comprises an ion-exchangeable component. The glass to be chemically tempered is, for example, alkali aluminosilicate glass, and for example, comprises as a glass composition, in terms of mass %, 50% to 80% of $SiO_2$, 5% to 25% of $Al_2O_3$, 0% to 15% of $B_2O_3$, 5% to 20% of $Na_2O$, and 0% to 10% of $K_2O$. In the case of this composition, the composition may be substantially free of $Li_2O$. The phrase "substantially free" as used in the present invention means that the content in question is less than 0.1% in terms of mass %.

As another example of the glass composition, the glass to be chemically tempered may comprise as the glass composition, in terms of mass %, 40% to 70% of $SiO_2$, 10% to 30% of $Al_2O_3$, 0% to 3% of $B_2O_3$, 5% to 25% of $Na_2O$, 0% to 5.5% of $K_2O$, 0.1% to 10% of $Li_2O$, 0% to 5.5% of MgO, and 2% to 10% of $P_2O_5$.

$Na_2O$ is an ion exchange component, and is also a component that lowers a viscosity at high temperature to increase meltability and formability. In addition, $Na_2O$ is also a component that improves devitrification resistance, including resistance to devitrification through a reaction with a forming body refractory, in particular, an alumina refractory. When the content of $Na_2O$ is too small, the meltability lowers, a thermal expansion coefficient lowers excessively, and an ion exchange rate is liable to lower. Thus, a suitable lower limit range of the content of $Na_2O$ is, in terms of mass %, 5% or more, 7% or more, 8% or more, 8.5% or more, 9% or more, 9.5% or more, 10% or more, 11% or more, or 12% or more, particularly 12.5% or more. Meanwhile, when the content of $Na_2O$ is too large, a viscosity at which phase separation occurs is liable to lower. In addition, acid resistance lowers, and the glass composition loses its component balance, with the result that the devitrification resistance lowers contrarily in some cases. Thus, a suitable upper limit range of the content of $Na_2O$ is 25% or less, 22% or less, 20% or less, 19.5% or less, 19% or less, 18% or less, 17% or less, 16.5% or less, 16% or less, or 15.5% or less, particularly 15% or less.

$K_2O$ is a component that lowers the viscosity at high temperature to increase the meltability and the formability. Further, $K_2O$ is also a component that improves the devitrification resistance, and increases a Vickers hardness. However, when the content of $K_2O$ is too large, the viscosity at which phase separation occurs is liable to lower. In addition, there is a tendency that the acid resistance lowers, and the glass composition loses its component balance, with the result that the devitrification resistance lowers contrarily. Thus, a suitable lower limit range of the content of $K_2O$ is, in terms of mass %, 0% or more, 0.01% or more, 0.02% or more, 0.1% or more, 0.5% or more, 1% or more, 1.5% or more, 2% or more, 2.5% or more, or 3% or more, particularly 3.5% or more, and a suitable upper limit range thereof is 10% or less, 5.5% or less, or 5% or less, particularly less than 4.5%.

$Li_2O$ is an ion exchange component, and is also a component that lowers the viscosity at high temperature to increase the meltability and the formability. Further, $Li_2O$ is a component that increases a Young's modulus. In addition, $Li_2O$ is also a component that dissolves at the time of ion exchange treatment to deteriorate an ion exchange solution. Accordingly, a mode of being substantially free of $Li_2O$ in the glass composition may be adopted as described above, but in the case of comprising $Li_2O$, a suitable lower limit range of the content of $Li_2O$ is, in terms of mass %, 0.1% or more, 0.5% or more, 1.0% or more, 1.5% or more, or 2.0% or more, particularly 2.5% or more, and a suitable upper limit range thereof is 10% or less, 8% or less, 5% or less, 4.5% or less, or 4.0% or less, particularly less than 3.5%.

The glass to be chemically tempered, which has been obtained as described above, is subjected to ion exchange treatment. Specifically, the glass to be chemically tempered is treated by being immersed in a molten salt for ion exchange treatment.

The molten salt is a salt containing a component capable of ion exchange with a component in the glass to be chemically tempered, and is typically an alkali nitrate. Examples of the alkali nitrate include $NaNO_3$, $KNO_3$, and $LiNO_3$. Those alkali nitrates may be used alone or as a mixture thereof. The mixing ratio of the alkali nitrates may be arbitrarily decided, and may be set to, for example, in terms of mass %, 5% to 95% of $NaNO_3$ and 5% to 95% of $KNO_3$, preferably 30% to 80% of $NaNO_3$ and 20% to 70% of $KNO_3$, more preferably 50% to 70% of $NaNO_3$ and 30% to 50% of $KNO_3$.

Conditions, such as a temperature of the molten salt and an immersion time, in the ion exchange treatment may be set in accordance with the composition and the like to the extent that the above-mentioned stress characteristics can be obtained. The temperature of the molten salt is, for example, from 350° C. to 500° C., preferably from 360° C. to 470° C., from 360° C. to 450° C., from 360° C. to 430° C., or from 360° C. to 410° C. In addition, the immersion time is, for example, from 3 minutes to 300 minutes, preferably from 5 minutes to 120 minutes, more preferably from 7 minutes to 100 minutes.

The shape, dimensions, and characteristics of the chemically tempered glass 1a to be etched may be inversely decided in consideration of the target shape, dimensions, and characteristics of the tempered glass 1b, and the influence of the etching to the extent that the above-mentioned features of the present invention are not impaired. For example, the dimensions and shape of the chemically tempered glass 1a to be etched may be designed to have a thickness and dimensions slightly larger than those of the tempered glass 1b by amounts corresponding to the etching amount in the etching treatment. In addition, the ion exchange conditions and the like may be adjusted so as to achieve slightly larger CSa and DOLa than those of the tempered glass 1b in consideration of a reduction in thickness through the etching.

The chemically tempered glass 1a to be etched, which has been obtained through the above-mentioned ion exchange treatment, is washed and dried, and then subjected to the etching treatment.

The chemically tempered glass 1a to be etched may be further subjected to polishing treatment after the ion exchange treatment and before the etching. When the ion exchange treatment fluctuates the dimensions, shape, and surface state of the chemically tempered glass 1a to be etched, adjustments may be made thereto by performing the polishing treatment. Meanwhile, a case in which the polishing treatment increases unnecessary microcracks is also conceivable, and hence, when as described above, the glass to be chemically tempered is an unpolished product formed by the overflow down-draw method or the like, and the main surfaces of the chemically tempered glass 1a to be etched after ion exchange treatment are also smooth non-polished surfaces (fire-polished surfaces), it is preferred to perform the etching without performing the polishing treatment.

In this embodiment, the above-mentioned chemically tempered glass 1a to be etched is etched by wet etching. Specifically, the entirety of the chemically tempered glass 1a to be etched is immersed in a liquid etching medium to etch all the surfaces of the chemically tempered glass 1a to be etched. According to such treatment, the entirety of the glass can be uniformly etched, and hence the occurrence of a variation in thickness due to the etching treatment can be suppressed.

An acidic or alkaline aqueous solution capable of etching glass may be used as the etching medium.

For example, an acidic aqueous solution containing HF may be used as an acidic etching medium. When the aqueous solution containing HF is used, an etching rate for glass is high, and hence the tempered glass 1b can be produced with high productivity.

The aqueous solution containing HF is, for example, an aqueous solution containing only HF, or a combination of: HF and HCl; HF and $HNO_3$; HF and $H_2SO_4$; or HF and $NH_4F$. The concentration of each compound, i.e., HF, HCl, $HNO_3$, $H_2SO_4$, or $NH_4F$ is preferably from 0.1 mol/L to 30 mol/L. In etching using the aqueous solution containing HF, a fluoride containing a glass component is produced as a by-product, and may cause a reduction in etching rate or a defect. However, when a mixed acid with another acid, such as HCl, $HNO_3$, or $H_2SO_4$, is adopted as described above, the by-product can be decomposed to suppress a reduction in productivity. When the etching is performed using the acidic aqueous solution, it is preferred that: a temperature of the acidic aqueous solution be, for example, from 10° C. to 30° C.; and a period of time for which the chemically tempered glass 1a to be etched is immersed be, for example, from 0.1 minute to 60 minutes.

An alkaline aqueous solution containing NaOH or KOH may be used as an alkaline etching medium. The alkaline aqueous solution has a relatively smaller etching rate for glass as compared to the above-mentioned etching medium containing HF, and hence has an advantage in that it is easy to precisely control the etching amount. The alkaline aqueous solution is suitable particularly when the thickness, DOLb, and the like of the glass need to be controlled in micrometers as in the present invention.

The concentration of the alkali component in the aqueous solution containing NaOH or KOH is preferably from 1 mol/L to 20 mol/L. When the etching is performed using the alkaline aqueous solution, it is preferred that: a temperature of the alkaline aqueous solution be, for example, from 10° C. to 130° C.; and a period of time for which the chemically tempered glass 1a to be etched is immersed be, for example, from 0.5 minute to 120 minutes. When the etching rate is increased to increase the productivity, the alkaline aqueous solution is preferably heated to a temperature of 80° C. or more. Conversely, when the etching amount is to be controlled with higher accuracy, the temperature of the alkaline aqueous solution is preferably limited to 70° C. or less. In addition, when more importance is given to the magnitude of the etching rate, the aqueous solution of NaOH is preferably used.

The etching is performed with the above-mentioned etching medium so that the etching amount Δt (loss in thickness due to the etching) on one surface of the chemically tempered glass 1a to be etched is 0.25 μm or more and 3 μm or less. The etching amount Δt of the chemically tempered glass 1a to be etched is preferably 0.4 μm or more and 2.7 μm or less, more preferably 0.5 μm or more and 2.6 μm or less, more preferably 0.6 μm or more and 2.5 μm or less, still more preferably 0.8 μm or more and 2.3 μm or less. When the etching loss is set to fall within such ranges, the amounts of fluctuations in maximum compressive stress and compressive stress depth before and after the etching are reduced and easily controlled.

After the above-mentioned etching, the tempered glass 1b is washed and dried, and protected by bonding a protective film thereto. In order to obtain high surface cleanliness without an adhesive residue or the like after the peeling of the protective film, it is preferred to use a protective film of a self-pressure-sensitive adhesive type, or a protective film provided with a pressure-sensitive adhesive having a slight pressure-sensitive adhesive property.

<Tempered Glass>

The tempered glass 1b according to the first embodiment of the present invention obtained as described above has the following features.

The tempered glass 1b comprises a compressive stress layer in a surface thereof. The maximum compressive stress CSb in the compressive stress layer of the tempered glass 1b (compressive stress layer after etching) is 950 MPa or less, preferably 500 MPa or more and 900 MPa or less, more preferably 520 MPa or more and 850 MPa or less, still more preferably 530 MPa or more and 800 MPa or less, or 550 MPa or more and 700 MPa or less.

The depth DOLb of the compressive stress layer of the tempered glass 1b (compressive stress layer after etching) is less than 14.75 μm, preferably 4 μm or more and less than 14 μm, more preferably 5 μm or more and 13 μm or less, or 7 μm or more and 12.5 μm or less.

A theoretical value of the depth DOLb of the compressive stress layer after etching may also be determined by the following equation (1) on the basis of the depth DOLa of the compressive stress layer before etching and the etching amount Δt.

$$DOLb = DOLa - \Delta t \tag{1}$$

The tempered glass 1b comprises a bendable thin portion 11b in at least part thereof. A surface of the thin portion 11b is formed of an etched surface. In this embodiment, all surfaces of the tempered glass 1b, that is, all of both front and back main surfaces and end surfaces, including the thin portion 11b, are formed of etched surfaces. By virtue of all the surfaces being etched as just described, the tempered glass 1b has high strength with defects reduced across all the surfaces.

The tempered glass 1b further comprises thick portions 12b each having a relatively larger thickness than the thin portion 11b. The tempered glass 1b comprises a plurality of the thick portions 12b. In this embodiment, surfaces of the thick portions 12b are also formed of etched surfaces.

The thin portion 11b is arranged so as to divide and mutually link the two thick portions 12b. In other words, the thin portion 11b extends in a band shape from one end of the tempered glass 1b to the other end thereof. More specifically, the thin portion 11b is arranged in parallel to the short sides so as to cross the main surfaces of the tempered glass 1b from the middle part of one long side to the middle part of the other long side.

The two thick portions 12b preferably have shapes that are line-symmetric with each other with respect to the thin portion 11b. According to such configuration, the tempered glass 1b can be folded in such a manner that the two thick portions 12b overlap each other, and is suitable for an application such as a foldable device.

A thickness t1b of the thin portion 11b is 149.5 μm or less, preferably 20 μm or more and 149 μm or less, more preferably 20 μm or more and 120 μm or less, still more preferably 25 μm or more and 100 μm or less, still more preferably 28 μm or more and 69.5 μm or less. The thickness of the thin portion 11b is preferably constant, but when the thickness is not constant, the thickness of the thinnest portion in the thin portion 11b may be determined as t1b.

A theoretical value of the thickness t1b of the thin portion 11b after etching may also be determined by the following equation (2) on the basis of the thickness t1a of the thin portion 11a before etching and the etching amount Δt.

$$t1b = t1a - 2 \times \Delta t \qquad (2)$$

A width W of the thin portion 11b is, for example, 3 mm or more and 50 mm or less, preferably 5 mm or more and 30 mm or less. The width of the thin portion 11b is preferably constant. When the width W is set to fall within such ranges, a range of motion required for folding can be sufficiently secured.

A thickness t2b of each of the thick portions 12b is, for example, 150 μm or more and 300 μm or less, preferably 160 μm or more and 270 μm or less, more preferably 170 μm or more and 250 μm or less. The thickness t2b of each of the thick portions 12b is preferably constant. When the thickness t2b of each of the thick portions 12b is set to fall within such ranges, deformability in each of the thick portions 12b can be appropriately suppressed to improve handleability at the time of assembly/manufacturing of a device.

A theoretical value of the thickness t2b of each of the thick portions 12b after etching may also be determined by the following equation (3) on the basis of the thickness t2a of each of the thick portions 12a before etching and the etching amount Δt.

$$t2b = t2a - 2 \times \Delta t \qquad (3)$$

The plan view dimensions of the tempered glass 1b are similar to those of the chemically tempered glass 1a to be etched before etching, and the length of each of the long sides thereof is, for example, 50 mm or more and 500 mm or less, preferably 60 mm or more and 450 mm or less, more preferably 65 mm or more and 400 mm or less, still more preferably 70 mm or more and 300 mm or less, 75 mm or more and 200 mm or less, or 80 mm or more and 160 mm or less. The length of each of the short sides thereof is, for example, 40 mm or more and 400 mm or less, preferably 45 mm or more and 350 mm or less, more preferably 50 mm or more and 300 mm or less, still more preferably 55 mm or more and 120 mm or less, or 60 mm or more and 80 mm or less.

In this embodiment, the thin portion 11b is, with a recessed groove portion formed on one main surface side of the tempered glass 1b, formed of the remainder of the other main surface side. The tempered glass 1b is foldable, for example, in such a direction that the recessed groove portion side faces outward (arrow R direction in FIG. 2). When the tempered glass is configured to be foldable in such direction, a flat surface thereof free of the recessed groove portion can serve as a touch surface of a foldable device, and the touch surface can be protected at the time of folding of the foldable device.

According to the tempered glass 1b and method of manufacturing the same described above, the stress characteristics and thickness dimensions thereof are suitably controlled, and further, surface defects are reduced through the etching. Thus, high bending performance, high bending strength, and suppression of shattering at the time of breakage can be simultaneously achieved.

In the above-mentioned first embodiment, the thin portion 11a is, with the recessed groove portion formed on one main surface side of the tempered glass 1b, formed of the remainder of the other main surface side. The thin portion 11a may be formed by forming recessed grooves on both main surfaces so that the cross-sectional middle portion of the tempered glass 1b remains. According to such configuration, the tempered glass can be made less liable to undergo breakage irrespective of whether the tempered glass is folded on its front side or its back side.

Second Embodiment

In the above-mentioned first embodiment, a case in which the tempered glass 1b comprises the thin portion 11b and the thick portions 12b has been exemplified. However, the entirety of the tempered glass may be formed of a thin portion. For a configuration or treatment not specified in a second embodiment described below, a configuration or treatment similar to that in the first embodiment may be applied, and detailed description thereof is omitted.

Figure 3:
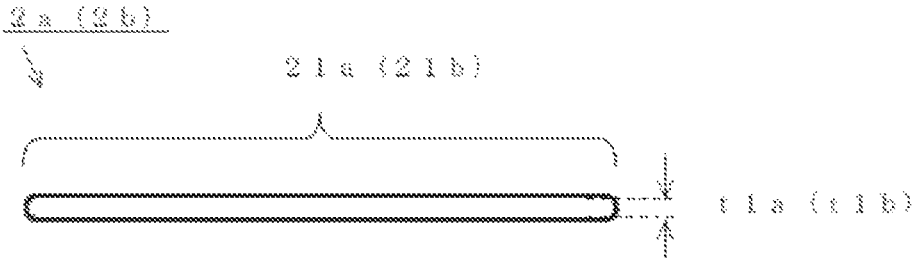
FIG. 3 is a cross-sectional schematic view of tempered glasses before and after etching according to a second embodiment of the present invention.

FIG. 3 is a cross-sectional schematic view of a tempered glass 2b according to the second embodiment of the present invention. The plan view shape and dimensions of the tempered glass 2b are similar to the plan view dimensions of the tempered glass 1b according to the first embodiment (FIG. 1). FIG. 3 is a view for illustrating a cross-section of the tempered glass 2b along the long sides thereof. Also in FIG. 3, as in FIG. 2, the schematic shapes of the glasses before and after etching are illustrated on the same drawing by denoting corresponding portions with reference symbols in parentheses.

As illustrated in FIG. 3, the tempered glass 2b after etching according to the second embodiment is entirely formed of a thin portion 21b, and has a substantially uniform thickness. In the present invention, having a substantially uniform thickness means that the glass has a deviation in thickness of ±10% or less. The thickness of the tempered glass 2b is similar to the thickness t1b of the thin portion 11b after etching according to the above-mentioned first embodiment. Stress characteristics (e.g., CS and DOL) of the tempered glass 2b may be configured to be similar to those of the tempered glass 1b according to the first embodiment.

The tempered glass 2b according to the second embodiment is obtained by subjecting a chemically tempered glass 2a to be etched to etching treatment.

First, the chemically tempered glass 2a to be etched is prepared. The tempered glass 2a is entirely formed of a thin portion 21a, and has a substantially uniform thickness. The thickness of the chemically tempered glass 2a to be etched is similar to the thickness t1a of the thin portion 11a before etching according to the above-mentioned first embodiment. Stress characteristics (e.g., CS and DOL) of the chemically tempered glass 2a to be etched may be configured to be similar to those of the chemically tempered glass 1a to be etched according to the first embodiment.

The chemically tempered glass 2a to be etched is obtained by subjecting glass to be chemically tempered having similar dimensions and a similar shape to ion exchange treatment similar to that of the first embodiment.

Etching conditions for the chemically tempered glass 2a to be etched may be set to be similar to those in the first embodiment.

According to the tempered glass 2b according to the second embodiment, the entire surface is configured to be the thin portion 21b, and hence the tempered glass can be bent at any portion thereof to enable an improvement in degree of freedom in device design. In addition, there is no need to form any recessed groove, and a tempered glass achieving both high bendability and high strength can be obtained with high productivity.

Modified Example

In each of the above-mentioned embodiments, a case in which all the surfaces of the tempered glass are subjected to the etching treatment, and all the surfaces are each formed of an etched surface has been exemplified. However, only the thin portion of the tempered glass may be subjected to the etching treatment. That is, only the surface of the thin portion may be formed of an etched surface, with the surface of any other region being formed of a non-etched surface. For example, such configuration may be achieved by performing the etching under a state in which any other region than the thin portion has been masked with a resin or the like in advance. According to such configuration, a reduction in compressive stress CS due to the etching can be suppressed in a region that is to serve as a main display surface.

In the tempered glass of the present invention, the maximum compressive stresses CSa and CSb in the compressive stress layer may be limited to be even lower than the above-mentioned ranges from the viewpoint of further suppressing shattering at the time of breakage. When the maximum compressive stresses are suppressed, an internal tensile stress can be suppressed to further suppress shattering at the time of breakage. Specifically, the upper limit of each of the maximum compressive stresses CSa and CSb may be set to 500 MPa or less, preferably 400 MPa or less, more preferably 300 MPa or less, still more preferably 200 MPa or less, or 150 MPa or less, and the lower limit thereof may be set to 50 MPa or more, or 100 MPa or more.

In the tempered glass of the present invention, from the viewpoint of further suppressing shattering at the time of breakage, a maximum value CTb of the internal tensile stress, which is calculated by the following equation (4) from the maximum compressive stress CSb in the compressive stress layer after all the surfaces of the tempered glass have been subjected to the etching treatment, the depth DOLb of the compressive stress layer, and the thickness t1b, is preferably 120 MPa or more and 450 MPa or less, more preferably 150 MPa or more, still more preferably 200 MPa or more.

$$CTb = CSb \lambda DOLb/(t1b - 2 \times DOLb) \tag{4}$$

When CTb is excessively large, energy remaining inside the glass after tempering is increased, and hence it becomes difficult to suppress shattering at the time of breakage. Meanwhile, when DOLb or CSb is excessively reduced in order to reduce CTb, it becomes difficult to obtain two-point bending strength or repeated bending strength sufficient for an application such as a foldable device.

The tempered glass of the present invention may be subjected to three-dimensional bending processing as required. Specifically, when the glass to be chemically tempered is entirely or partially subjected to the three-dimensional bending processing in advance, a three-dimensionally bent shape can be imparted to the tempered glass after having gone through the ion exchange treatment and the etching treatment.

In each of the above-mentioned embodiments, a case in which the chemically tempered glass to be etched before etching is subjected to the ion exchange treatment once has been exemplified. However, the chemically tempered glass to be etched may be subjected to the ion exchange treatment twice or three or more times. In addition, heat treatment may be performed before or after the ion exchange. Through the heat treatment, the relaxation of stress and the depth of the compressive stress layer can be controlled.

An example in which the glass is immersed in an etchant has been described. However, the etching may be performed by causing the etchant to adhere to the surface of the glass by a shower method or a spray method, or performed by applying the etchant only to a required portion. In addition, the etching may be performed using a known dry etching technique without being limited to the wet etching.

The glass according to each of the above-mentioned embodiments may be used as a laminate by being laminated with any plate-shaped or sheet-shaped resin material or metal material via an adhesive or the like.

EXAMPLES

The method of manufacturing a tempered glass according to the present invention and a mixture for ion exchange are hereinafter described based on Examples. The following Examples are merely illustrative, and the present invention is by no means limited to the following Examples.

Samples were produced as described below. First, glass for ion exchange comprising as a glass composition, in terms of mass %, 61.5% of $SiO_2$, 18.0% of $Al_2O_3$, 0.5% of $B_2O_3$, 2.0% of $K_2O$, 14.5% of $Na_2O$, 0.1% of $Li_2O$, 3.0% of MgO, and 0.4% of $SnO_2$ was prepared.

Specifically, glass raw materials were blended so as to achieve the above-mentioned composition, and were melted with a platinum pot at 1,600° C. for 21 hours. After that, the resultant molten glasses were subjected to flow-down forming from a refractory forming body by using an overflow down-draw method, and formed and processed into dimensions and shapes shown in Tables 1 and 2 to provide glasses to be tempered.

Glasses for which thickness dimensions of thick portions are shown in Tables 1 and 2 are each a glass including thick portions and a thin portion like the glass according to the above-mentioned first embodiment. For the glass including thick portions and a thin portion, a plate-shaped sample having a uniform thickness of the thick portions was produced first, and then the thin portion was formed by etching so as to have a band width W of 20 mm and a shape similar to that of FIG. 2. Glasses for which it is shown in Tables 1 and 2 that thick portions are absent are each such a glass that the entirety of the glass is formed of a thin portion like the glass according to the above-mentioned second embodiment. Two kinds of samples, i.e., a sample having plan view dimensions of 50 mm×150 mm to be used for a two-point bending test to be described later, and a sample having plan view dimensions of 50 mm×50 mm to be used for a pen drop test to be described later were prepared for each glass.

Then, the glasses to be tempered were immersed in a molten salt and subjected to ion exchange treatment under conditions described in Tables 1 and 2 so as to achieve stress characteristics shown in the tables to provide chemically tempered glasses to be etched. Then, the chemically tempered glasses to be etched were etched under conditions shown in Tables 1 and 2 to provide tempered glasses.

In Tables 1 and 2, Nos. 1 to 9 are Examples of the present invention, and Nos. 10 and 11 are Comparative Examples.

Maximum compressive stresses (CSa and CSb) and compressive stress depths (DOLa and DOLb) in Tables 1 and 2 are values measured using a surface stress meter FSM-6000LE manufactured by Orihara Industrial Co., Ltd. An etching amount was determined from the value of a difference between the thicknesses of glasses before and after etching.

16

Each sample obtained as described above was evaluated for its strength by performing a two-point bending test, a continuous bending test, and a pen drop test in the following manner.

In the two-point bending test, the glass sample was bent and deformed at its long-side middle part by applying a gradually increasing stress thereto under the conditions of an ambient temperature of 25° C. and a humidity of 50%, and the stress at the time point when the glass sample fractured was measured as a fracture stress. A glass having thick portions was tested by being bent in the R direction illustrated in FIG. 2.

TABLE 1

| | | | 1 | 2 | 3 | 4 | 5 | 6 | 7 | 8 | 9 |
|---|---|---|---|---|---|---|---|---|---|---|---|---|
| Chemically tempered glass to be etched (before etching) | Sheet thickness (µm) | Thin portion t1a | 50 | 50 | 70 | 50 | 50 | 50 | 35 | 35 | 35 |
| | | Thick portion t2a | 200 | Absent | Absent | Absent | Absent | Absent | Absent | Absent | Absent |
| | Ion exchange conditions | Temperature (° C.) | 390 | 390 | 410 | 390 | 390 | 390 | 390 | 390 | 390 |
| | | Time (minute(s)) | 65 | 50 | 30 | 60 | 45 | 20 | 25 | 45 | 15 |
| | CSa (MPa) | | 690 | 700 | 800 | 690 | 720 | 1,050 | 930 | 720 | 870 |
| | DOLa (µm) | | 14 | 13 | 12.5 | 13 | 12.5 | 8 | 10 | 11 | 8 |
| Etching conditions | Medium (concentration) | | HF (2.5 mol/ L) + HCl (1 mol/ L) | | | NaOH (18 mol/L) | KOH (13 mol/L) | HF (2.5 mol/L) + HCl (1 mol/L) | | | |
| | Temperature (° C.) | | 25 | 25 | 25 | 100 | 120 | 25 | 25 | 25 | 25 |
| | Time (minute(s)) | | 0.5 | 0.4 | 0.5 | 10 | 7 | 0.5 | 0.5 | 0.5 | 0.5 |
| Etching amount | One surface Δt (µm) | | 2 | 1.5 | 2 | 1.5 | 1 | 1 | 2 | 1.5 | 1.5 |
| | Both surfaces (µm) | | 4 | 3 | 4 | 3 | 2 | 2 | 4 | 3 | 3 |
| Tempered glass (after etching) | Sheet thickness (µm) | Thin portion t1b | 46 | 47 | 66 | 47 | 48 | 48 | 31 | 32 | 32 |
| | | Thick portion t2b | 196 | Absent | Absent | Absent | Absent | Absent | Absent | Absent | Absent |
| | CSb (MPa) | | 590 | 620 | 690 | 610 | 670 | 900 | 670 | 630 | 580 |
| | DOLb (µm) | | 12 | 11.5 | 11 | 11.5 | 11.5 | 7 | 8 | 9.5 | 6 |
| | CTb (µm) | | 322 | 297 | 173 | 292 | 308 | 185 | 357 | 428 | 174 |

TABLE 2

| | | No. | 10 | 11 |
|---|---|---|---|---|
| Chemically tempered glass to be etched (before etching) | Sheet thickness (µm) | Thin portion | 70 | 50 |
| | | Thick portion | 200 | Absent |
| | Ion exchange conditions | Temperature (° C.) | 390 | 390 |
| | | Time (minute(s)) | 100 | 90 |
| | CSa (MPa) | | 560 | 510 |
| | DOLa (µm) | | 18 | 17.5 |
| Etching conditions | Medium (concentration) | | HF (2.5 mol/L) + HCl (1 mol/L) | |
| | Temperature (° C.) | | 25 | 25 |
| | Time (minute(s)) | | 0.5 | 0.4 |
| Etching amount | One surface Δt (µm) | | 2 | 1.5 |
| | Both surfaces (µm) | | 4 | 3 |
| Tempered glass (after etching) | Sheet thickness (µm) | Thin portion | 66 | 47 |
| | | Thick portion | 196 | Absent |
| | CSb (MPa) | | 510 | 470 |
| | DOLb (µm) | | 16 | 16 |
| | CTb (µm) | | 240 | 501 |

In the continuous bending test, the glass sample was bonded onto a foldable plate notched at its middle part, and it was recognized whether or not the glass sample fractured during 200,000 continuous repetitions of bending movement involving bending and deforming the glass sample at the thin portion in its long-side middle part so as to obtain a final radius of 1.5 mm under the conditions of an ambient temperature of 25° C. and a humidity of 50%, and then returning the glass sample to a flat state. In the tables, a case in which no breakage was observed at the bent portion after the continuous bending test is marked with Symbol "o", and a case in which breakage was recognized is marked with Symbol "x".

The results of the two-point bending test and the continuous bending test are shown in FIG. 4, Table 3, and Table 4. FIG. 4 shows the results of the two-point bending test as a box-and-whisker plot, and Table 3 and Table 4 show read values thereof. FIG. 4, Table 3, and Table 4 each show a distribution of sampled evaluation results for 30 samples each of which fractured owing to a crack of in-plane origin.

TABLE 3

| | | No. | | | | | | | | |
|---|---|---|---|---|---|---|---|---|---|---|
| | | 1 | 2 | 3 | 4 | 5 | 6 | 7 | 8 | 9 |
| Two-point bending fracture stress (MPa) | Maximum value | 2,790 | 2,910 | 3,300 | 2,950 | 3,125 | 2,330 | 5,630 | 6,060 | 4,840 |
| | Third quartile | 2,150 | 2,470 | 2,770 | 2,310 | 2,430 | 2,050 | 5,130 | 5,350 | 4,030 |
| | Median | 1,730 | 2,060 | 2,200 | 1,870 | 2,020 | 1,980 | 4,910 | 4,675 | 3,770 |
| | First quartile | 1,550 | 1,680 | 1,910 | 1,630 | 1,820 | 1,910 | 4,490 | 3, 655 | 2,970 |
| | Minimum value | 1,210 | 1,350 | 1,540 | 1,320 | 1,360 | 1,730 | 3,670 | 2,050 | 1,875 |
| Continuous bending test | | — | ○ | — | ○ | ○ | ○ | ○ | ○ | ○ |

TABLE 4

| | No. | 10 | 11 |
|---|---|---|---|
| Two-point bending fracture stress (MPa) | Maximum value | 2,350 | 2,320 |
| | Third quartile | 1,810 | 1,780 |
| | Median | 1,510 | 1,430 |
| | First quartile | 1,120 | 1,070 |
| | Minimum value | 810 | 770 |
| Continuous bending test | | x | x |

In the pen drop test, the glass sample was placed on a stainless-steel (SUS) sheet having a thickness of 3 mm without bonding, and was tested by vertically dropping the nib of a ballpoint pen having a ball diameter of 0.5 mm and a mass of 12.5 g onto the center of the glass sample. The drop height of the ballpoint pen was gradually increased until the glass sample fractured, and the number of broken pieces of the fractured glass was counted. Minute broken pieces are difficult to count, and hence broken pieces to be counted were limited to ones each having a maximum outer diameter of 0.1 mm or more. The test was performed for five samples of each glass, and their average value was calculated. For a glass sample having thick portions and a thin portion, the test was performed by placing the glass sample with its flat surface directed downward (its recessed groove portion directed upward), and dropping the nib onto the thin portion.

The evaluation results of the pen drop test are shown in Table 5 and Table 6.

TABLE 5

| | No. | | | | | | | | |
|---|---|---|---|---|---|---|---|---|---|
| | 1 | 2 | 3 | 4 | 5 | 6 | 7 | 8 | 9 |
| Number of broken pieces before etching (pcs) | 42 | 31 | 43 | 26 | 17 | 50 | 15 | 5 | 7 |
| Number of broken pieces after etching (pcs) | 12 | 13 | 14 | 9 | 10 | 25 | 8 | 3 | 4 |

TABLE 6

| No. | 10 | 11 |
|---|---|---|
| Number of broken pieces | 1,000 or | 1,000 or |

TABLE 6-continued

| No. | 10 | 11 |
|---|---|---|
| before etching (pcs) | more | more |
| Number of broken pieces after etching (pcs) | 1,000 or more | 1,000 or more |

According to the results of the above-mentioned two-point bending test, Examples maintained high maximum surface compressive stresses at higher levels than Comparative Examples, and hence were recognized to have higher bending strengths than Comparative Examples. For glass for a foldable application, the value of the first quartile shown in Table 3 and Table 4 is preferably 1,500 MPa or more.

According to the results of the above-mentioned pen drop test, the number of broken pieces of glass at the time of breakage was suppressed after etching as compared to that before etching, and hence it was recognized that shattering was suppressed. In addition, in each Example, by virtue of setting the compressive stress layer to be relatively shallow to suppress the internal tensile stress, it was recognized that the number of broken pieces at the time of fracture was small, and hence shattering was able to be suppressed, as compared to Comparative Examples.

Examples described above are merely examples, and as another Example of the present invention, there may be used glass for ion exchange comprising as a glass composition, in terms of mass %, 66.0% of $SiO_2$, 14.0% of $Al_2O_3$, 2.5% of $B_2O_3$, 0.6% of $K_2O$, 13.4% of $Na_2O$, 0.1% of $Li_2O$, 3.0% of MgO, and 0.4% of $SnO_2$. The use of the glass for ion exchange of such composition can improve chemical durability while having strength similar to those of Examples described above.

INDUSTRIAL APPLICABILITY

The tempered glass and method of manufacturing the same of the present invention are applicable to, for example, a tempered glass to be used for the following and manufacturing thereof: a cover glass for each of a smartphone, a cellular phone, a tablet computer, a personal computer, a digital camera, a touch panel display, and other display devices; and an on-vehicle display device and an on-vehicle panel, in particular, a device including a foldable or rollable display, a device including a curved screen display, and the like.

REFERENCE SIGNS LIST 1a, 2a chemically tempered glass to be etched (before etching)

1b, 2b tempered glass (after etching)
11a, 21a thin portion (before etching)
11b, 21b thin portion (after etching)
12a thick portion (before etching)
12b thick portion (after etching)
The invention claimed is:

1. A method of manufacturing a tempered glass, the method comprising:

an etching step of etching a plate-shaped or sheet-shaped chemically tempered glass having a compressive stress layer in a surface thereof, and a step of preparing, as the chemically tempered glass before the etching, a chemically tempered glass, which has in at least part thereof a bendable thin portion having a thickness t1a, in which the thickness t1a is 150 μm or less, in which a maximum compressive stress CSa in the compressive stress layer before the etching is 1,100 MPa or less, and in which a depth DOLa of the compressive stress layer before the etching is less than 15 μm, wherein the etching step comprises etching the chemically tempered glass so that an etching amount Δt on one surface of the chemically tempered glass is 0.25 μm or more and 3 μm or less, wherein the etching causes a maximum value CTb of an internal tensile stress of the chemically tempered glass after the etching, which is determined by the following equation (A), where t1b represents a thickness of the bendable thin portion after the etching, CSb represents a maximum compressive stress in the compressive stress layer after the etching, and DOLb represents a depth of the compressive stress layer after the etching, to be 240 MPa or more and 450 MPa or less, $$CTb=CSb \times DOLb/(t1b-2 \times DOLb)$$ (A), and wherein the etching causes the depth DOLb of the compressive stress layer after the etching to be 14.75 μm or less.

2. The method of manufacturing a tempered glass according to claim 1, wherein the etching causes the thickness t1b of the bendable thin portion after the etching to be 149.5 μm or less, and the maximum compressive stress CSb in the compressive stress layer after the etching to be 400 MPa or more and 950 MPa or less.

3. The method of manufacturing a tempered glass according to claim 1, wherein the chemically tempered glass before the etching comprises a plurality of thick portions each having a thickness t2a larger than the thickness t1a of the bendable thin portion before the etching, wherein the thickness t2a is more than 150 μm, and wherein the bendable thin portion before the etching extends in a band shape between the plurality of thick portions.

4. The method of manufacturing a tempered glass according to claim 1, wherein the chemically tempered glass before the etching has a substantially uniform sheet thickness.

5. The method of manufacturing a tempered glass according to claim 1, wherein the etching is wet etching, and wherein the etching is performed by bringing an etching medium into contact with all surfaces of the chemically tempered glass.

6. The method of manufacturing a tempered glass according to claim 5, wherein the etching medium is an aqueous solution containing HF, wherein the aqueous solution containing HF is an aqueous solution containing only HF at a concentration of from 0.1 mol/L to 30 mol/L, or an aqueous solution containing HF at a concentration of from 0.1 mol/L to 30 mol/L, and one substance selected from the group consisting of: HCl; HNO₃; H₂SO₄; and NH₄F, the one substance having a concentration of from 0.1 mol/L to 30 mol/L, and wherein the etching is performed by immersing the chemically tempered glass in the aqueous solution having a temperature of from 10° C. to 30° C. for from 0.1 minute to 60 minutes.

7. The method of manufacturing a tempered glass according to claim 5, wherein the etching medium is an alkaline aqueous solution.

8. The method of manufacturing a tempered glass according to claim 7, wherein the alkaline aqueous solution is an aqueous solution containing NaOH or KOH as an alkali component, and wherein the etching is performed by immersing the chemically tempered glass in the aqueous solution, which has a concentration of the alkali component of from 1 mol/L to 20 mol/L and a temperature of from 10° C. to 130° C., for from 0.5 minute to 120 minutes.

9. The method of manufacturing a tempered glass according to claim 1, wherein main surfaces of the chemically tempered glass before the etching are non-polished surfaces.

* * * * *